US008398900B2

(12) United States Patent  
Tudury et al.

(10) Patent No.: US 8,398,900 B2  
(45) Date of Patent: Mar. 19, 2013

(54) SELF-COMPENSATING MULTI-MODE FIBER

(75) Inventors: Gaston E. Tudury, Lockport, IL (US); Richard J. Pimpinella, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/858,210

(22) Filed: Aug. 17, 2010

(65) Prior Publication Data

US 2011/0037183 A1   Feb. 17, 2011

Related U.S. Application Data

(60) Provisional application No. 61/234,530, filed on Aug. 17, 2009, provisional application No. 61/235,506, filed on Aug. 20, 2009.

(51) Int. Cl.
*B29D 11/00* (2006.01)

(52) U.S. Cl. .................................................. 264/1.28

(58) Field of Classification Search .................. 264/1.28
See application file for complete search history.

(56) References Cited

U.S. PATENT DOCUMENTS

| 6,790,529 B2 | 9/2004 | Pleunis et al. |
| 2005/0008312 A1 | 1/2005 | Jang et al. |

FOREIGN PATENT DOCUMENTS

WO              9733390 A1      9/1997

OTHER PUBLICATIONS

Gholami et al. ("Compensation of Chromatic Dispersion by Modal Dispersion in MMF- and VCSEL-Based Gigabit Ethernet Transmissions" IEEE Photonics Tech. Letters May 15, 2009).*

OFC/NFOEC Conference "Differential Mode Delay (DMD) for Multimode Fiber Types and its Relationship to Measured Performance", Mar. 6, 2005-Mar. 11, 2005 (7 pages).
Technical Paper, Panduit Corp. Certifying Multimode Fiber Channel Links for 10 GB/S Ethernet, May 1, 2005 (4 pages).
Internet Citation, Panduit Corp., "Correlation of BER Performance to EMBc and DMD Measurements for Laser Optimized Multimode Fiber", Jan. 1, 2007 (6 pages).
LANLine Magazine, "Important Considerations for Assuring 10GB/s Ethernet Channel Link Performance—Part I", Nov. 2007, (11 pages).
LANLine Magazine, "Important Considerations for Assuring 10GB/s Ethernet Channel Link Performance—Part II", Dec. 2007, (7 pages).
Internet Citation, Panduit Corp., "Certifying Multimode Fiber for 100 Gb/s Ethernet Transmission", Jan. 2008, (9 pages).

* cited by examiner

*Primary Examiner* — Larry Thrower
(74) *Attorney, Agent, or Firm* — Robert A. McCann; Christopher S. Clancy; Zachary J. Smolinski

(57) ABSTRACT

An improved multimode fiber optic cable is designed to compensate for the wavelength distribution and emission pattern of laser sources used in high-speed communication systems. The improved multimode fiber optic cable compensates for the wavelength dependent VCSEL polar emission pattern to reduce modal dispersion. Techniques for reducing the modal dispersion within the improved multimode fiber optic cable allow for improved Bit Error Rate (BER) system performance and/or to achieve greater reach in high bandwidth optical channel links are disclosed. Considerable efforts have been undertaken in the design and production of an improved multimode fiber optic cable to minimize modal dispersion, ignoring the effects of wavelength dependent polar emission patterns in lasers. Material dispersion effects have a significant impact on modal dispersion and by modifying a standard parabolic refractive index profile to compensate for material dispersion effects, overall modal dispersion can be reduced.

7 Claims, 9 Drawing Sheets

|  | CURRENT | MINIMUM | MAXIMUM | TOTAL MEAS |
|---|---|---|---|---|
| EYE WIDTH ( ) | 67.38 ps | 64.85 ps | 67.40 ps | 100 |
| FALL TIME ( ) | 97.33 ps | 61.33 ps | 97.78 ps | 100 |
| RISE TIME ( ) | 83.11 ps | 13.78 ps | 83.11 ps | 100 |
| JITTER RMS ( ) | 4.770 ps | 4.766 ps | 5.117 ps | 100 |

|  | CURRENT | MINIMUM | MAXIMUM | TOTAL MEAS |
|---|---|---|---|---|
| EYE WIDTH ( ) | 55.17 ps | 54.01 ps | 55.18 ps | 100 |
| FALL TIME ( ) | 48.44 ps | 20.44 ps | 106.22 ps | 101 |
| RISE TIME ( ) | 80.00 ps | 4.89 ps | 80.44 ps | 101 |
| JITTER RMS ( ) | 6.879 ps | 6.803 ps | ? 48.650 ps | 101 |

SELF-COMPENSATING MULTI-MODE FIBER

CROSS-REFERENCES TO RELATED APPLICATIONS

This application claims priority to U.S. Provisional Application No. 61/234,530, filed Aug. 17, 2009; and U.S. Provisional Patent Application Ser. No. 61/235,506, filed Aug. 20, 2009, the subject matter of which is hereby incorporated by reference in its entirety.

The present application incorporates in their entireties U.S. Provisional Patent Application Ser. No. 61/187,137, entitled "DESIGN METHOD AND METRIC FOR SELECTING AND DESIGNING MULTIMODE FIBER FOR IMPROVED PERFORMANCE," filed Jun. 15, 2009; and U.S. Provisional Patent Application Ser. No. 61/118,903, entitled "MULTIMODE FIBER HAVING IMPROVED INDEX PROFILE," filed Dec. 1, 2008.

BACKGROUND

Degradation of an optical pulse propagating through an optical fiber is the result of attenuation and dispersion. Dispersion is the broadening of discrete data bits as they propagate through the media. Pulse broadening results in an overlap between sequential data bits causing an increase in the uncertainty whether a bit is interpreted as logic 0 or 1. This uncertainty in logic state is quantified in terms of bit error rate (BER), where the BER is defined as the number of error bits divided by the total number of bits transmitted in a given period of time. For high-speed Ethernet, the BER cannot exceed 1 error bit for every 1 trillion bits transmitted (BER<$10^{-12}$). There are two contributions to the total dispersion in multimode fiber: chromatic dispersion, or material dispersion, and modal dispersion.

Chromatic or material dispersion occurs because the refractive index of a material changes with the wavelength of light. This is due to the characteristic resonance frequencies at which the material responds to light (light is a propagating electromagnetic field). Shorter wavelengths encounter a higher refractive index (i.e., greater optical density) and consequently travel slower than longer wavelengths. Since a pulse of light typical comprises several wavelengths, the spectral components of the optical signal spread in time, or disperse, as they propagate, causing the pulse width to broaden.

Optical fiber is nearly pure silica ($SiO_2$), so the chromatic or material dispersion of fiber is essentially the same as pure fused silica. In FIG. 1 we plot the material dispersion of fused silica and the refractive index as a function of wavelength. Since the refractive index of a material is wavelength dependent, $n(\lambda)$, the velocity of light in a material is also wavelength dependent related by, $$v(\lambda) = \frac{c}{n(\lambda)} \tag{1}$$

Where, c is the speed of light in vacuum (299,792,458 meters/second).

Referring to Equation 1, the refractive index for a short wavelength (referred to as "blue" light) is larger than that for a longer wavelength (referred to as "red" light) so that light of longer wavelengths ("red") travels faster than shorter wavelengths ("blue").

For light traveling through a medium with this characteristic, the effect is called "normal" dispersion. If the refractive index for shorter wavelengths is lower than longer wavelengths, the dispersion is called anomalous, as blue light will travel faster than red light.

In addition to material dispersion, optical signals traversing optical waveguides such as a multimode fiber optic cable (MMF) also undergo modal dispersion, which is generally a much larger effect in MMF. Due to the wave nature of light and the wave-guiding properties of optical fiber, an optical signal traverses the fiber along discrete optical paths called modes. The optical power of the pulse is carried by the sum of the discrete modes. With reference to FIGS. 2A and 2B, MMF is optimized so that all modes arrive at the output of the fiber at the same time. This is achieved by adjusting or "grading" the refractive index profile of the fiber core. Modes traveling with larger angles (and consequently traverse longer distances) must travel faster. These are called high-order modes. Modes traveling with small angles (low-order modes) travel slower in graded-index fiber. The difference in propagation delays between the fastest and slowest modes in the fiber is used to determine the inter-modal dispersion or simply modal dispersion.

To minimize modal dispersion, standard Graded Index Multimode Fiber (GI-MMF) is designed so the index of refraction across the core follows a parabolic distribution (referred to herein as the standard parabolic refractive index profile). The formula describing the radial distribution in refractive index for minimum modal dispersion is given by $$n(r) = n_1 \left[ 1 - 2\left(\frac{r}{R}\right)^\alpha \Delta \right]^{\frac{1}{2}} \tag{2}$$

Where $\alpha$ is a number close to 2 (and specific to each fiber manufacturer), R is the radius of the fiber core and $\Delta$ is given by $$\Delta = \frac{n_1^2 - n_2^2}{2n_1^2} \tag{3}$$

The metric used to characterize modal dispersion in MMF is Differential Mode Delay (DMD), specified in Telecommunications Industry Association Document No. TIA-455-220-A and expressed in units of picoseconds per meter (ps/m) so that the total delay is normalized by fiber length. Low modal dispersion as measured by DMD generally results in higher-bandwidth MMF. Better control in the manufacturing process produces a profile closer to the standard parabolic refractive index profile which minimizes modal dispersion. It would be desirable to make changes to the standard parabolic refractive index profile to compensate for the wavelength distribution and emission pattern of a light source to reduce modal dispersion beyond current capabilities. Furthermore, it would be desirable that these changes be included in current MMF test methods to accurately characterize DMD and fiber bandwidth.

SUMMARY

In one aspect, a method for manufacturing an improved multimode fiber optic cable which compensates for both material dispersion and modal dispersion effects is provided. The method includes, but is not limited to, coupling a laser with a reference multimode fiber optic cable and generating and launching a plurality of pulses of light radiation by the laser into the reference multimode fiber optic cable. Each pulse of light radiation is launched at different radial offset. The method also includes, but is not limited to, determining a DMD waveform profile along with a pulse delay for each pulse of light at each radial offset and determining if there are differences in pulse delays for each DMD waveform profile. The method also includes, but is not limited to, designing the improved multimode fiber optic cable with an improved refractive index profile which compensates for any differences in pulse delay present in each DMD waveform profile, and which compensates for at least a portion of the material dispersion present in the reference multimode fiber optic cable.

In one aspect, a method for designing an improved multimode fiber optic cable which compensates for both material dispersion and modal dispersion effects is provided. The method includes, but is not limited to, determining an amount of material and modal dispersion within a reference multimode fiber optic cable resulting from a pulse of light radiation launched into the multimode fiber optic cable using a laser and designing an improved refractive index profile for the improved multimode fiber optic cable which compensates for at least a portion of the material dispersion present in the reference multimode fiber optic cable.

In one aspect, a method for designing an improved multimode fiber optic cable which compensates for both material dispersion and modal dispersion effects is provided. The method includes, but is not limited to, generating and launching a plurality of pulses of light radiation into a reference multimode fiber optic cable. Each pulse of light radiation is launched at different radial offset. The method also includes, but is not limited to determining a DMD waveform profile along with a pulse delay for each pulse of light at each radial offset and designing an improved refractive index profile for the improved multimode fiber optic cable which compensates for at least a portion of the material dispersion present in the reference multimode fiber optic cable by correcting for any differences in pulse delay present in each DMD waveform profile.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that multimode fiber optic cable having a refractive index profile may be designed to compensate for both material dispersion as well as modal dispersion when used with light sources that emit modes having different optical wavelengths in different emission patterns. The proposed multimode fiber optic cable compensates for the spatial spectral distribution of laser launch modes when coupled into fiber modes to reduce overall modal dispersion. The disclosed multimode fiber optic cable exhibits improved Bit Error Rate (BER) system performance by balancing the wavelength dependency of the VCSEL modes and the refractive index profile of the multimode fiber optic cable to reduce modal dispersion. The disclosed multimode fiber optic cable also increases the maximum reach over which a signal can be transmitted with acceptable error rates. The refractive index profile of the multimode fiber optic cable exhibits a Differential Mode Delay (DMD) waveform profile that shifts to the left (in ps/m as shown in standard graphical depictions of DMD) at larger radial offsets to compensate for a spatial distribution of emitted optical wavelengths in an optical source.

In this disclosure we relate these effects to glass optical fiber. However, this invention is equally applicable to plastic optical fiber (POF) and other waveguide structures.

Provided herein is a method for manufacturing a multimode fiber which compensates for both material dispersion and modal dispersion effects. The method first includes determining an amount of material and modal dispersion within a reference multimode fiber resulting from a pulse of light radiation launched into the multimode fiber using a laser. The method then includes designing an improved refractive index profile for the improved multimode fiber which compensates for at least a portion of the material dispersion present in the reference multimode fiber optic cable.

Figure 1:
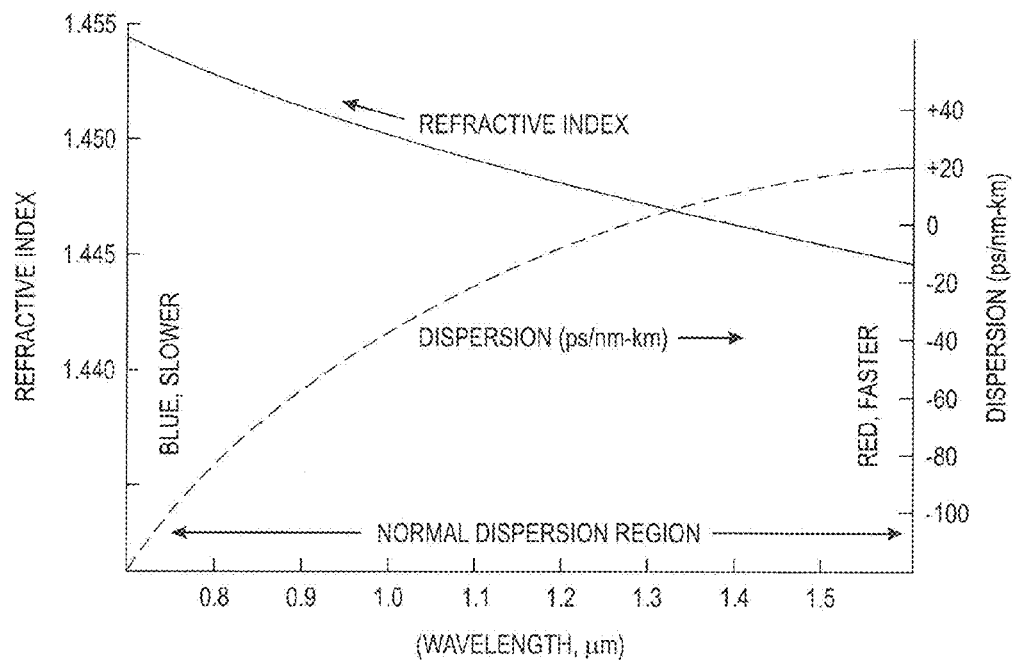
FIG. 1 depicts a graph of material dispersion and a refractive index of pure silica as a function of wavelength, in accordance with one embodiment of the present invention.
Figure 2A:
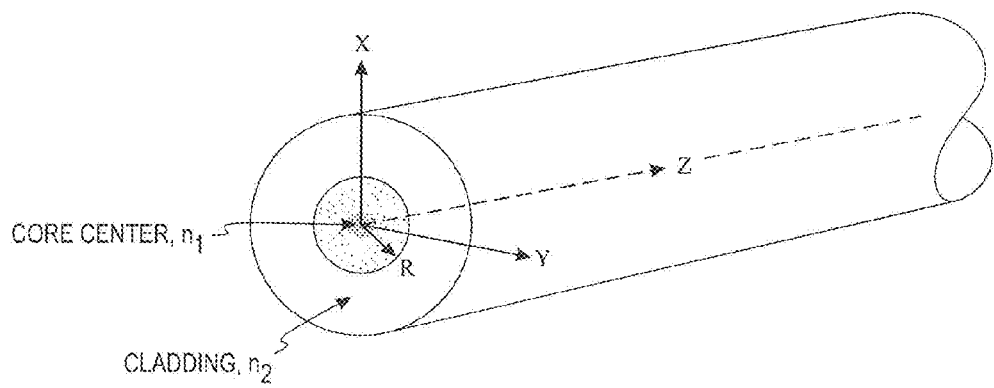
FIG. 2A depicts a first cross-sectional perspective view of a graded index MMF with different mode trajectories, in accordance with one embodiment of the present invention.
Figure 2B:
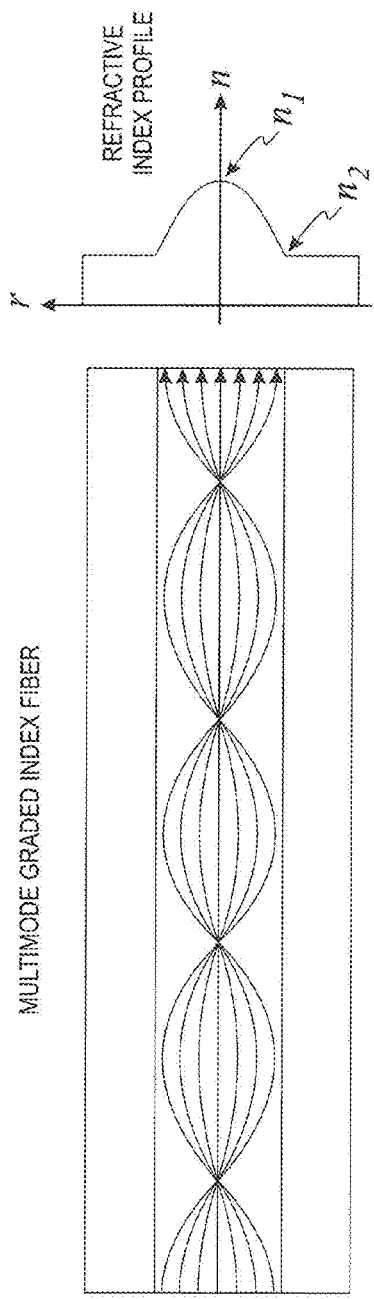
FIG. 2B depicts a second cross-sectional perspective view of a graded index MMF having a standard parabolic refractive index profile that equalizes the velocities of the various modes traversing the fiber, in accordance with one embodiment of the present invention. All modes are supposed to have the same wavelength in prior models.
Figure 3:
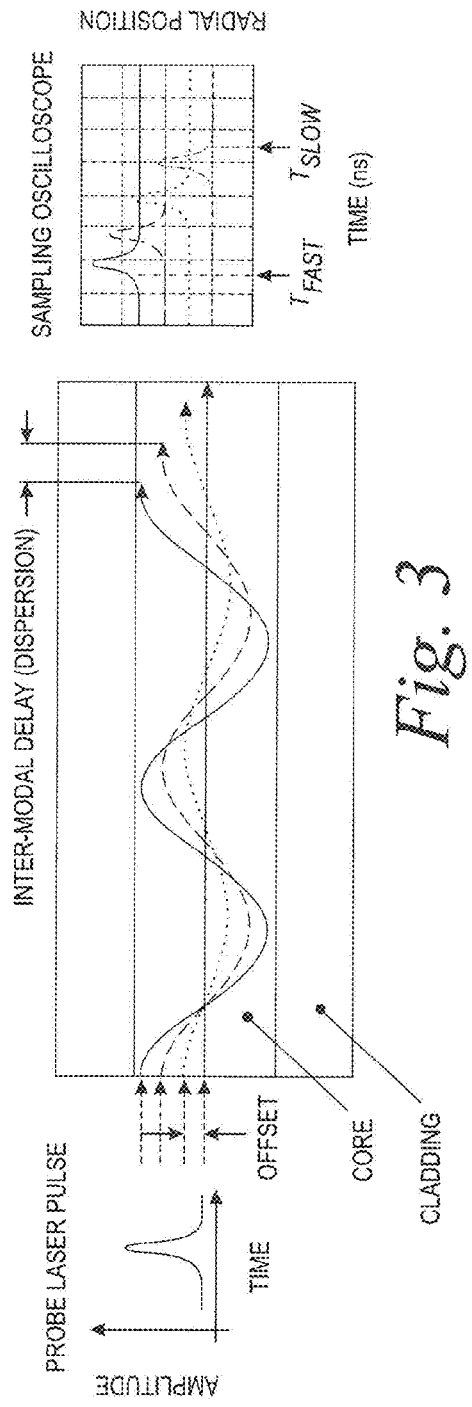
FIG. 3 depicts a graph of a DMD waveform to measure the difference in arrival time of all modes in a GI-MMF, in accordance with one embodiment of the present invention. From that time difference, normalized by the length of the fiber, the fiber is graded and classified to comply as OM3 or OM4 type fiber. Different colors are used for clarification purposes only. All modes have the same wavelength.

With reference to FIG. 3, determining an amount of material and modal dispersion within a reference multimode fiber requires first implementing a revised DMD measurement test method, wherein a temporally short and spectrally pure optical pulse of light radiation is generated and transmitted by a laser and launched into the core of a reference MMF under test. The optical pulse of light radiation is first launched along the center axis of the fiber and an output pulse waveform is measured with a photo-detector and sampling oscilloscope. The output pulse waveform is stored for subsequent analysis. The launched optical pulse of light radiation is then displaced a small radial distance from a central core of the reference MMF, typically 1 or 2 microns, and an output waveform is again measured and recorded. This procedure is repeated across the core of the MMF from the center to a radial distance X away from the center and close to the core-cladding interface. For example, X is approximately 23 microns (±5 microns) for a 50 micron core diameter. To ensure only modes for a given radial launch offset are excited, a small diameter single-mode fiber is preferably used to launch the optical pulse of light radiation into the core of the MMF.

Figure 4A:
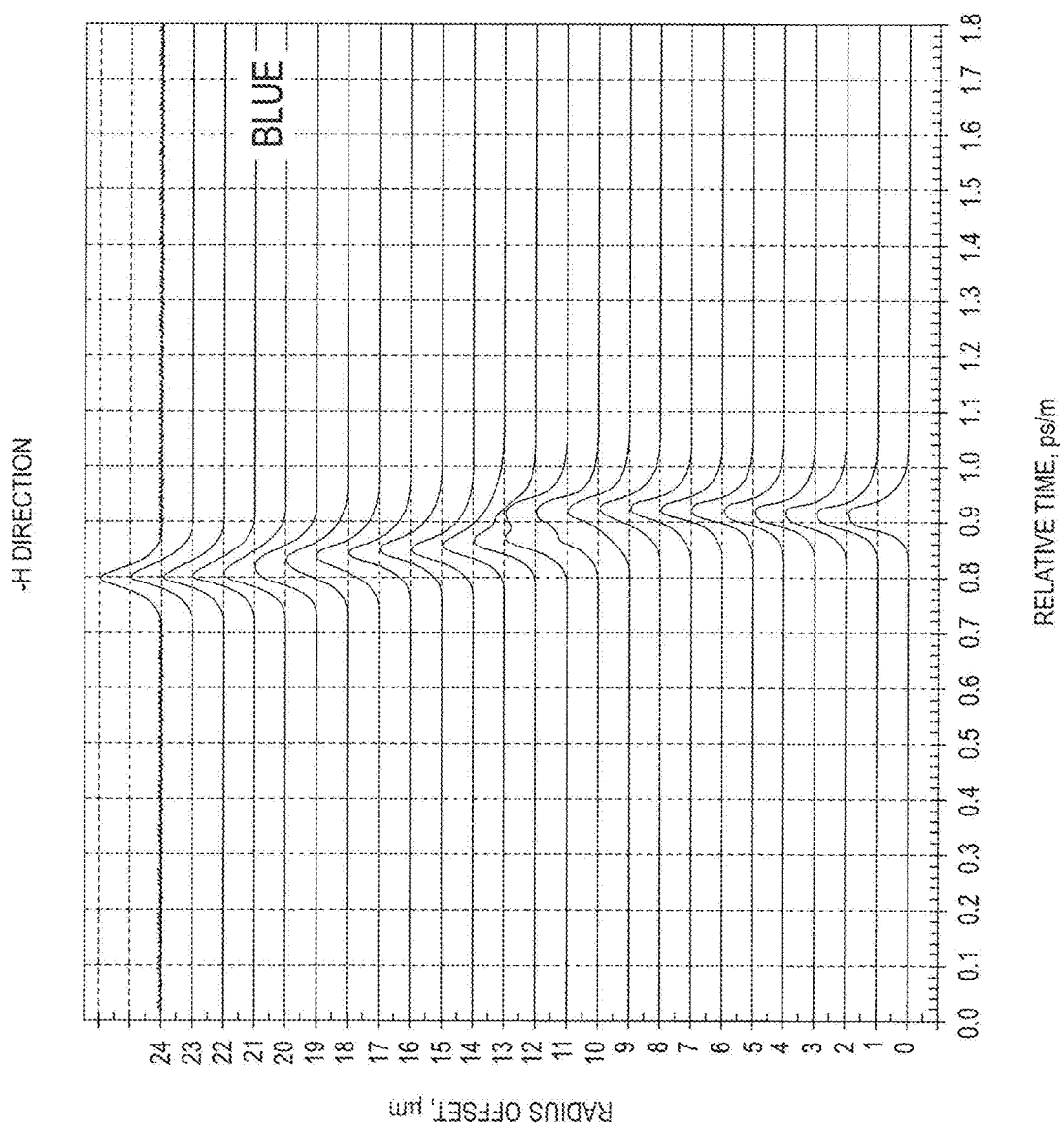
FIGS. 4A and 4B depict graphs of DMD waveform profiles of two fibers with similar DMD and EMB values, in accordance with one embodiment of the present invention. Both fibers are from the same fiber cable. Both have an EMB of 4540 MHz·km.
Figure 4B:
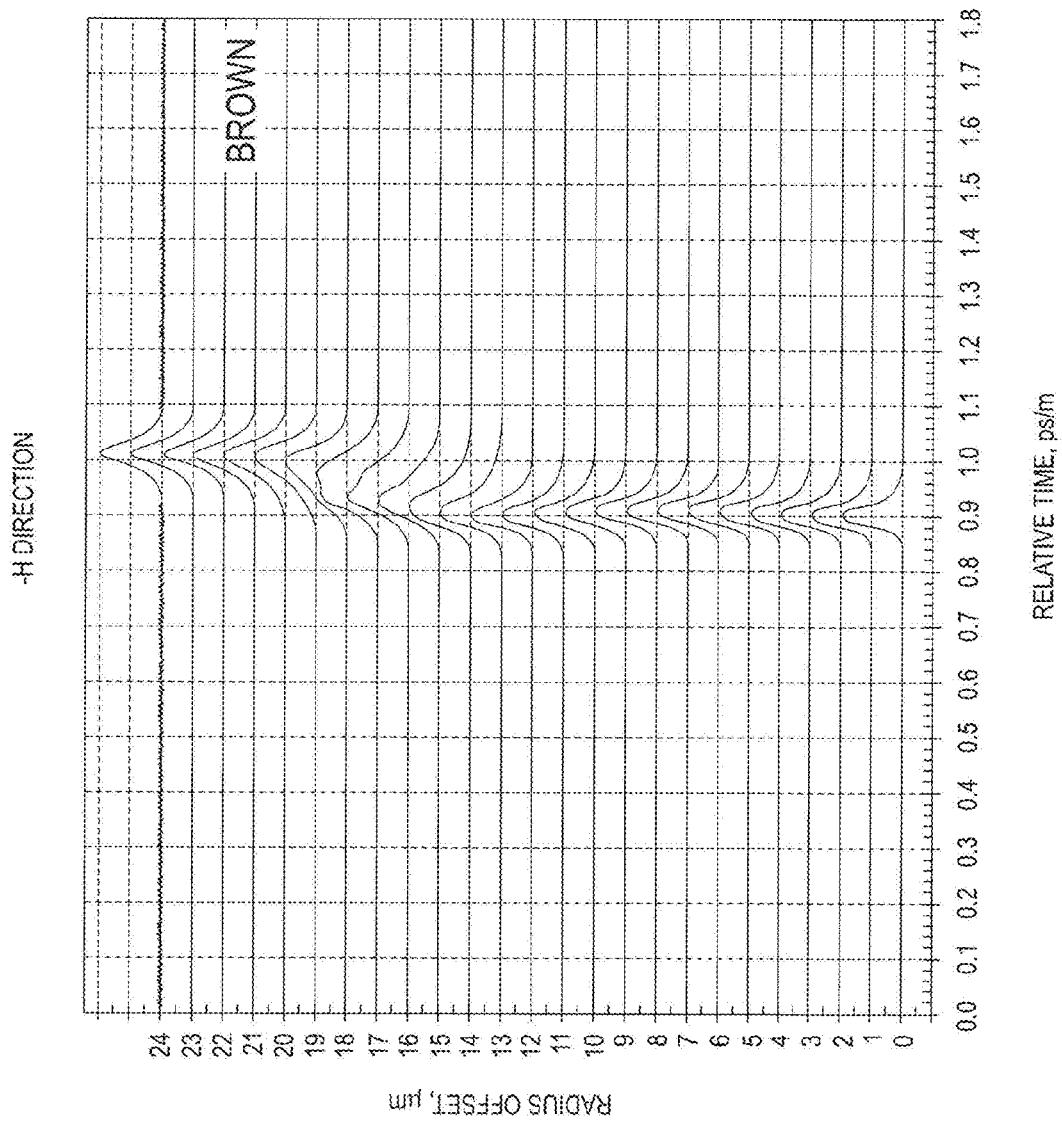

With reference to FIGS. 4A and 4B, an example of the resultant output waveforms for two MMF's (a Blue MMF and a Brown MMF) is shown. The waveforms for each radial offset are shown along the vertical axis, and the pulse delay of each waveform is displayed along the horizontal axis. Ideally, all pulses should arrive at the output of the fiber at the same time for the standard parabolic index profile. However, imperfections in the uniformity of the refractive index profile result in temporal shifts of the output waveforms. The DMD or modal dispersion of a MMF is calculated by subtracting the launch pulse temporal width from the difference in arrival times between the leading edge of the fastest pulse and the falling edge of the slowest pulse.

Using a standard DMD test method specified in TIA-455-220-A, MMF fiber can be classified as laser optimized (i.e., OM3), capable of supporting 10 Gb/s Ethernet communications up to 300 m (in theory). The fiber must meet 1 of 6 DMD mask templates, which specify the maximum modal dispersion (i.e., DMD) within radial regions of the core. If the fiber meets more stringent DMD requirements (to be specified by TIA), the fiber is characterized as OM4, capable of supporting a greater reach. Low modal dispersion as measured by DMD, is believed to translate to higher MMF performance.

Another useful metric that characterizes the bandwidth capability of MMF is Effective Modal bandwidth (EMB) expressed in units of Megahertz kilometer (MHz·km). The EMB is a calculated metric derived from the pulse waveforms obtained in the DMD measurement. The set of measured output waveforms are summed to model the resultant output signal waveform. Using a mathematical conversion to the frequency domain, the output and input waveforms are numerically divided to compute the bandwidth of the fiber. Applying weighting functions to simulate the radial optical power distribution of ten representative Vertical Cavity Surface Emitting Lasers (VCSELs), the minimum calculated EMB is determined (min EMBc). Using the min EMBc metric, the EMB of the fiber is calculated by a multiplication factor of 1.13 (i.e., EMB=1.13×min EMBc). To be characterized as OM3 and OM4, as specified in high speed Ethernet standards, the EMB values for these fibers must be at least 2000 MHz·km and 4700 MHz·km, respectively.

Figure 5A:
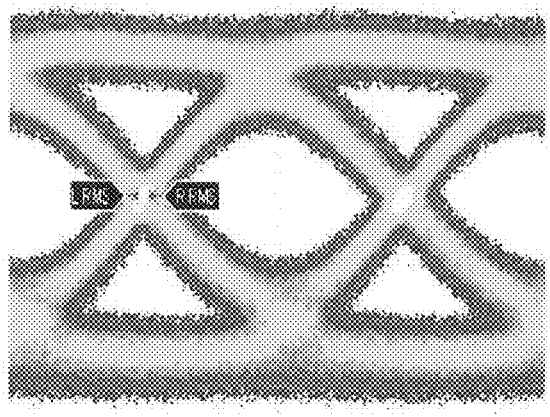
FIGS. 5A and 5B depict eye diagrams for Blue and Brown fibers, in accordance with one embodiment of the present invention. The eye diagram for the Blue fiber is shown in FIG. 5a and exhibits a wider eye opening, which indicates a larger signal-to-noise ratio and therefore transmits information with fewer errors (better BER performance).
Figure 5B:
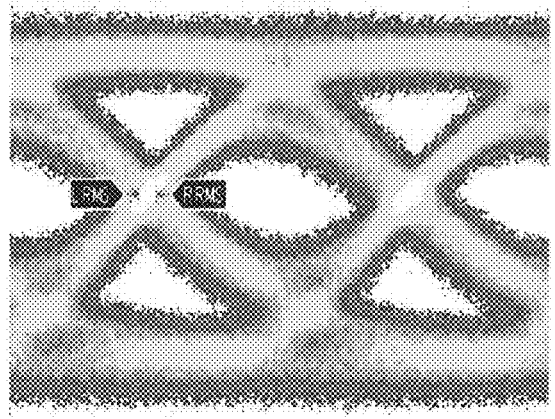
Figure 6:
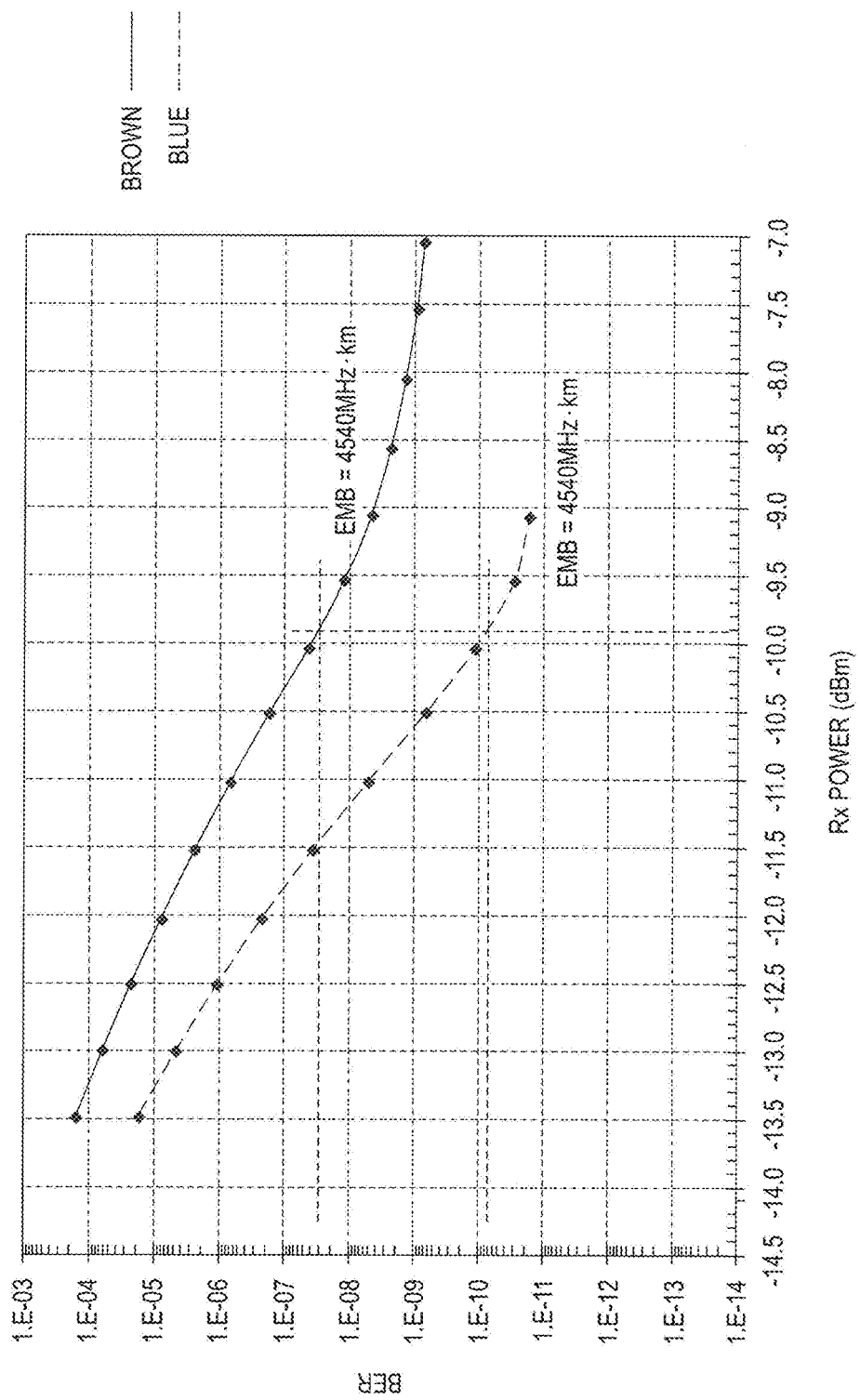
FIG. 6 depicts a graph of BER traces of Blue and Brown fibers as a function of received power, in accordance with one embodiment of the present invention. We note that for a received optical power of −9.9 dBm (minimum optical power for 10 GBASE-SR), the difference in BER performance is more than two orders of magnitude.

Because standard DMD and EMB utilize techniques that are based on time delay measurements using a monochromatic source (as specified in TIA-455-220-A), they are unable to discern between the two fibers shown in FIGS. 4A and 4B. The Blue and Brown fibers contained in the same optical cable are virtually identical by the metrics of DMD and EMB (See Table 1). Nonetheless they exhibit large differences in measured channel performance as benchmarked by analyzing the eye diagram, as shown in FIGS. 5A and 5B, and the Bit Error Rate Test (BERT) performance, as shown in FIG. 6.

TABLE 1

| Fiber | Inner Mask DMD (5 to 18 microns) | Outer Mask DMD (0 to 23 microns) | EMB (EMB = 1.13 × EMBc) |
|---|---|---|---|
| Blue | 0.122 ps/m | 0.145 ps/m | 4540 MHz*km |
| Brown | 0.124 ps/m | 0.132 ps/m | 4540 *km |

A relationship between BER system performance and DMD waveform shift has been discovered. The root cause is related to the left and right DMD temporal waveform shifts at large radial offsets, and the wavelength emission patterns of VCSELs. This difference can be observed in FIGS. 4A and 4B. VCSELs emit a single longitudinal mode coupled with multiple transverse modes resulting in a distribution of light with slightly different wavelengths over the area of emission. Each VCSEL mode has a defined polar emission pattern. This physical effect is referred to herein as a polar pattern having a radius-dependent wavelength. By determining if there are differences in pulse delays for each DMD waveform profile, or the polar pattern having a radius-dependent wavelength, both material dispersion and modal dispersion effects can be compensated for, further reducing modal dispersion from previous methods.

Figure 7:
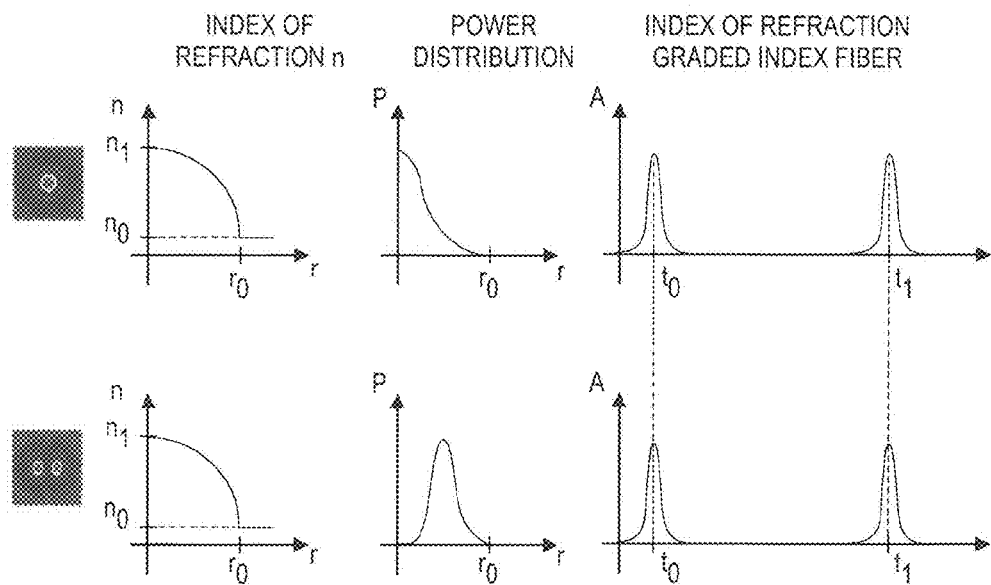
FIG. 7 depicts graphs illustrating that minimizing modal dispersion requires that all the modes arrive at the same time at the output end of the fiber (illustrated for two low order modes), in accordance with one embodiment of the present invention. In previous implementations, modes have been assumed to have same wavelength.

The impact of this emission pattern on the propagation of fiber modes is described below. The standard parabolic refractive index profile (based on an α value, as described by Equation 2) is currently designed to minimize the spread of all modes travelling through the fiber, with the assumption that all the modes have substantially the same wavelength (color). With reference to FIG. 7, laser source emission patterns and wavelength distribution effects have been completely neglected.

Figure 8:
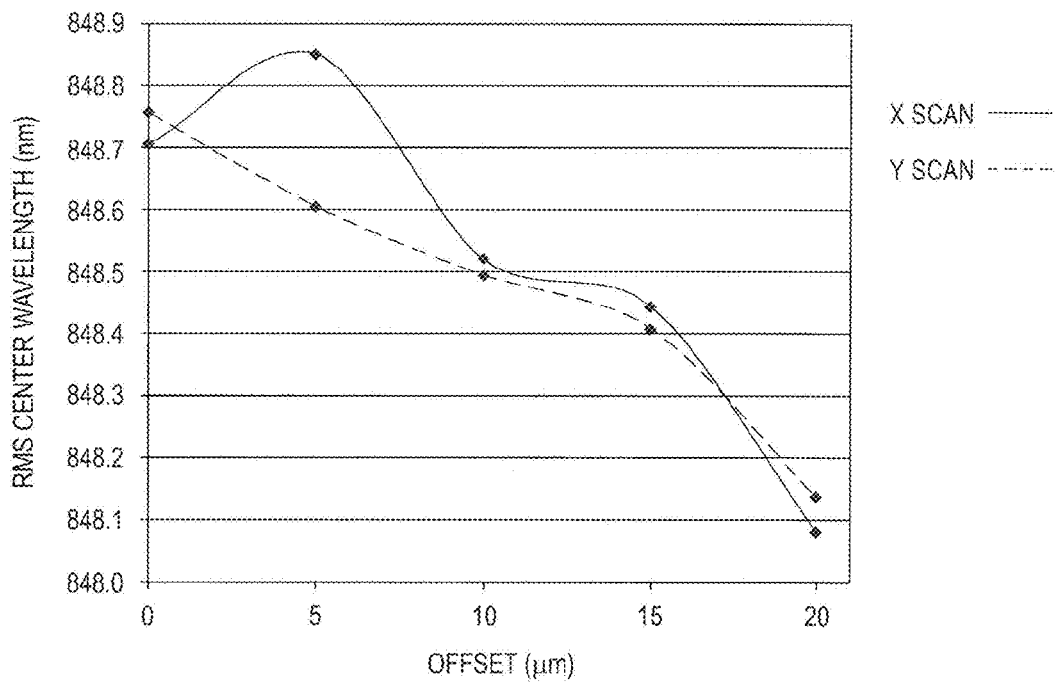
FIG. 8 depicts a graph of a wavelength dependence of a BERT Vertical Cavity Surface Emitting Lasers (VCSEL) as a function of offset from the center of a device, in accordance with one embodiment of the present invention.
Figure 9:
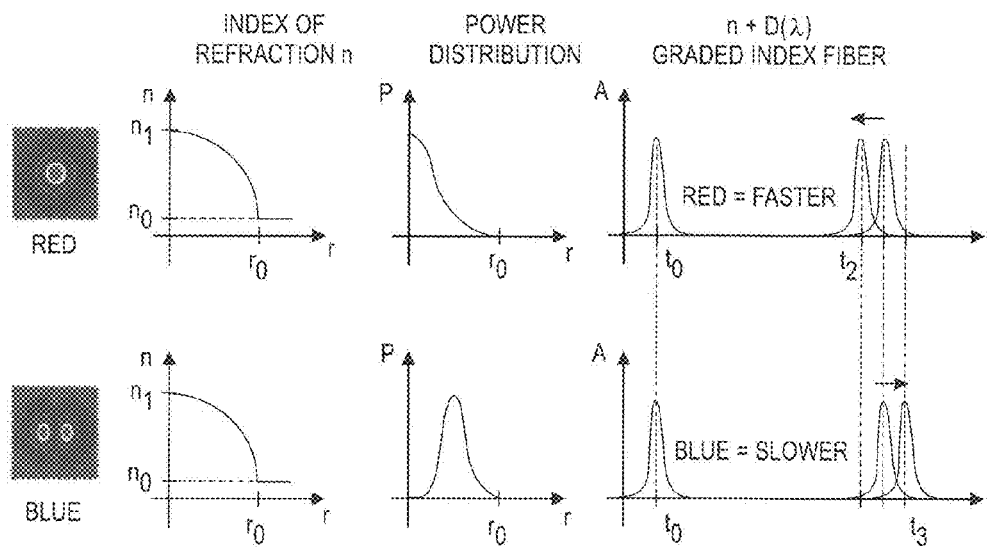
FIG. 9 depicts graphs illustrating that when a wavelength variation of modes is taken into consideration, material dispersion effects, $D(\lambda)$, will spread the components of a pulse even for a standard parabolic refractive index profile, in accordance with one embodiment of the present invention. The "blue" mode will arrive at the output of the fiber at a later time than the "red" mode.

However, VCSELs used in high-speed optical transceivers emit light with different wavelengths across the aperture of the device (modes). Longer wavelengths are emitted into smaller angles whereas short wavelengths are emitted into larger angles normal to the surface (polar emission pattern). With reference to FIG. 8, this VCSEL spatial spectral distribution is preserved when coupled into fiber modes. The standard parabolic DMD waveform profile used today is valid only for the same wavelength of light across the aperture of the VCSEL, where all coupled fiber modes are believed to have the same center wavelength. The spatial distribution of optical wavelengths launched into the MMF requires a new preferred DMD waveform profile since the modes, with their radius-dependent wavelengths, are influenced by material dispersion effects. The effect of the radius-dependent emission pattern coupled with modal dispersion is illustrated in FIG. 9. Lower order modes have longer wavelengths ("red") and therefore travel faster than high order modes having shorter wavelengths ("blue").

Figure 10:
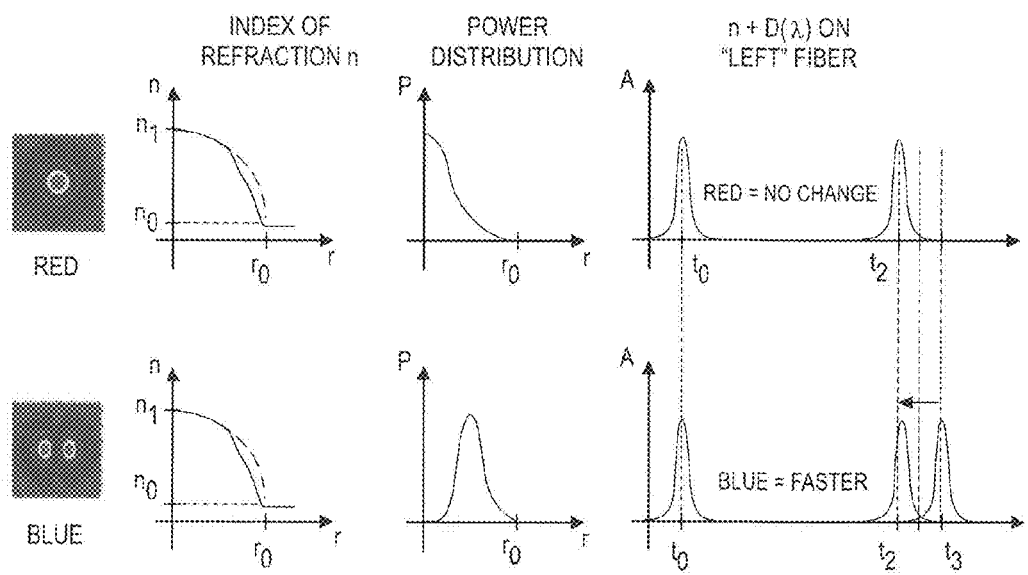
FIG. 10 depicts graphs illustrating that a fiber with lower than standard parabolic index of refraction (with the standard index of refraction being indicated with a dotted line) in the outer region of the core will speed up higher order modes ("blue"), while not affecting the lower order modes ("red") cancelling the material dispersion effects, in accordance with one embodiment of the present invention.

Based on data from our experimentation, fibers that exhibit a "left" shift in the radial pulse waveforms in the DMD profile (smaller values in ps/m) correspond to a lower-than-standard parabolic index of refraction in the outer region of the MMF core. This is observed at large radial offsets in the DMD waveform profile for the Blue fiber in FIG. 4A. The lower-order modes will not be affected by this shift in refractive index, as they do not travel through the outer region. Although higher-order modes are slowed down as a result of the wavelength-dependent index of refraction, as shown in FIG. 9, since they travel in a region of lower than the so-called standard parabolic refractive index profile they in fact catch up with the "red" light (See FIG. 10).

Figure 11:
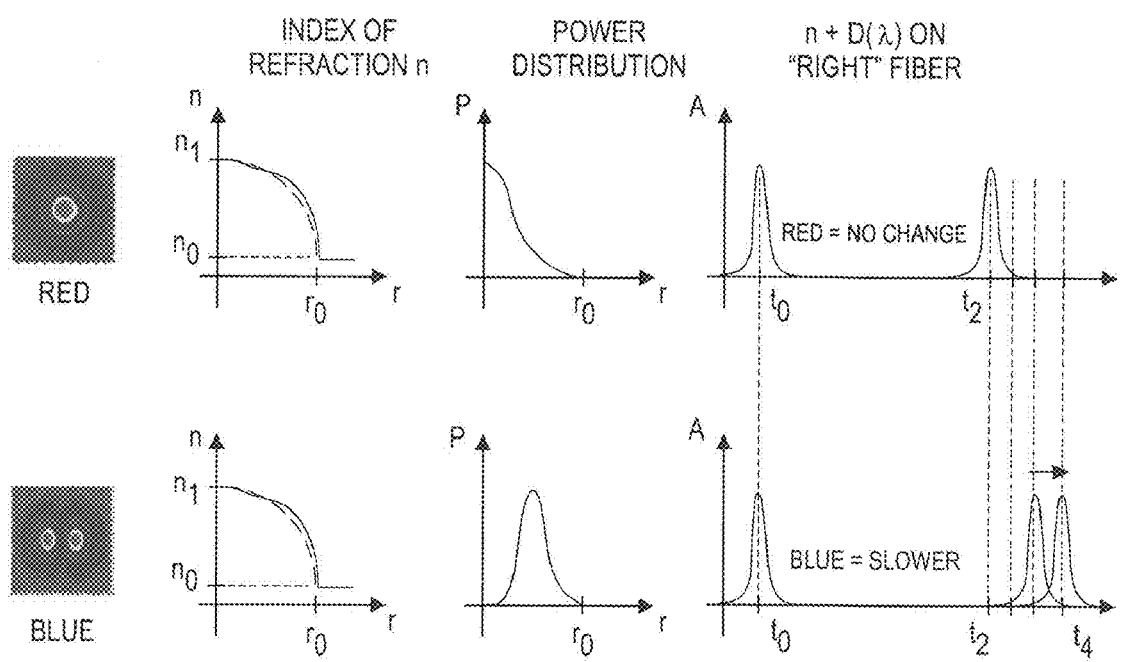
FIG. 11 depicts graphs illustrating that a fiber with higher than the standard index of refraction in the outer region of the core will slow down higher order modes ("blue"), while not affecting the lower order modes ("red"), exacerbating the material dispersion effects, in accordance with one embodiment of the present invention.

For fibers having a "right" shift in large radial offset waveforms, the index of refraction is higher than the standard parabolic refractive index in the outer region of the core. This is seen in the DMD waveforms of the Brown fiber at high radial offsets, as shown in FIG. 4B. The lower-order modes will not be affected by this shift in refractive index, as they do not travel through that region. Higher order modes that were slowed down by the wavelength-dependent index of refraction, as shown in FIG. 9, will travel through a region with higher than the standard parabolic index profile, and therefore slow down the "blue" light even further (See FIG. 11).

We have determined that the spectral distribution and polar emission patterns of VCSELs cannot be neglected and therefore, the current ideal DMD waveform profile is not optimal for minimum modal dispersion. Based on this discovery, by taking into account the differing wavelengths of the VCSELs modes, modal dispersion can be reduced, resulting in a modal wavelength compensated multimode fiber optic cable.

Minimizing modal dispersion can transform modal wavelength compensated MMF into a fiber that is primarily limited by its attenuation (plus the other penalties related to the VCSEL such as mode partition noise, modal noise, etc.). Using the IEEE 10 GBASE-SR link model, it is predicted that this improvement can potentially increase the maximum channel link reach from 125 m to potentially more than 200 m. By taking into consideration the spatial and spectral distributions of the light launched from VCSELs, an improved refractive index profile can be designed for an improved MMF that compensates for at least a portion of the wavelength dependency of the modes, allowing for modal dispersion to be further reduced from previous compensation methods.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A method for manufacturing a self-compensating multimode fiber optic cable which compensates for both material dispersion and modal dispersion effects comprising:
   coupling a laser with a reference multimode fiber optic cable;
   generating and launching a plurality of pulses of light radiation by the laser into the reference multimode fiber optic cable, wherein each pulse of light radiation is launched at different radial offset;
   determining a DMD waveform profile along with a pulse delay for each pulse of light at each radial offset;
   determining if differences in pulse delays form a left or a right DMD temporal waveform shift as the radial offsets are increased;
   designing the self-compensating multimode fiber optic cable with a refractive index profile which compensates for any differences in pulse delay present in each DMD waveform profile, and which compensates for at least a portion of the material dispersion present in the reference multimode fiber optic cable; and
   manufacturing the self-compensating multimode fiber optic cable according to the design;
   wherein the refractive index profile comprises a lower-than-standard parabolic index of refraction in an outer region of a core of the reference multimode fiber optic cable if the reference multimode fiber optic cable exhibits a left temporal waveform shift as the radial offsets are increased; or
   wherein the refractive index profile comprises a higher-than-standard parabolic index of refraction in an outer region of a core of the reference multimode fiber optic cable if the reference multimode fiber optic cable exhibits a right DMD temporal waveform shift as the radial offsets are increased.

2. The method of claim 1, wherein the refractive index profile, which compensates for at least a portion of the material dispersion present in the reference multimode fiber optic cable, is designed by either increasing or reducing any compensation within the multimode fiber optic cable for modal dispersion effects.

3. The method of claim 1 further comprising using a single-mode fiber for launching each one of the plurality of pulses of light radiation into the reference multimode fiber optic cable.

4. A method for designing a self-compensating multimode fiber optic cable which compensates for both material dispersion and modal dispersion effects comprising:
   generating and launching a plurality of pulses of light radiation into a reference multimode fiber optic cable, wherein each pulse of light radiation is launched at different radial offset;
   determining a DMD waveform profile along with a pulse delay for each pulse of light at each radial offset;
   determining if differences in pulse delays form a left or a right DMD temporal waveform shift as the radial offsets are increased;
   designing a refractive index profile for the self-compensating multimode fiber optic cable which compensates for at least a portion of the material dispersion present in the reference multimode fiber optic cable by correcting for any differences in pulse delay present in each DMD waveform profile; and
   manufacturing the self-compensating multimode fiber optic cable according to the design;

wherein the refractive index profile comprises a lower-than-standard parabolic index of refraction in an outer region of a core of the reference multimode fiber optic cable if the reference multimode fiber optic cable exhibits a left temporal waveform shift as the radial offsets are increased; or wherein the refractive index profile comprises a higher-than-standard parabolic index of refraction in an outer region of a core of the reference multimode fiber optic cable if the reference multimode fiber optic cable exhibits a right DMD temporal waveform shift as the radial offsets are increased.

5. The method of claim 4, wherein the refractive index profile, which compensates for at least a portion of the material dispersion present in the reference multimode fiber optic cable, is designed by either increasing or reducing any compensation within the multimode fiber optic cable for modal dispersion effects.

6. The method of claim 4 further comprising using a single-mode fiber for launching each one of the plurality of pulses of light radiation into the reference multimode fiber optic cable.

7. The method of claim 4 further comprising coupling a laser with a reference multimode fiber optic cable.

* * * * *